Nov. 4, 1958 L. A. DEVER 2,858,745
TRACING MECHANISM FOR MACHINE TOOLS
Filed Nov. 15, 1956 2 Sheets-Sheet 2
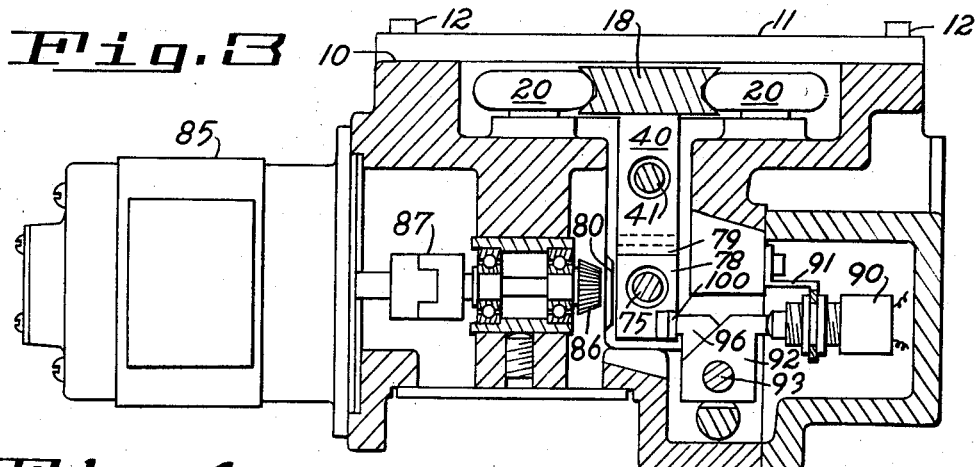
Fig. 3
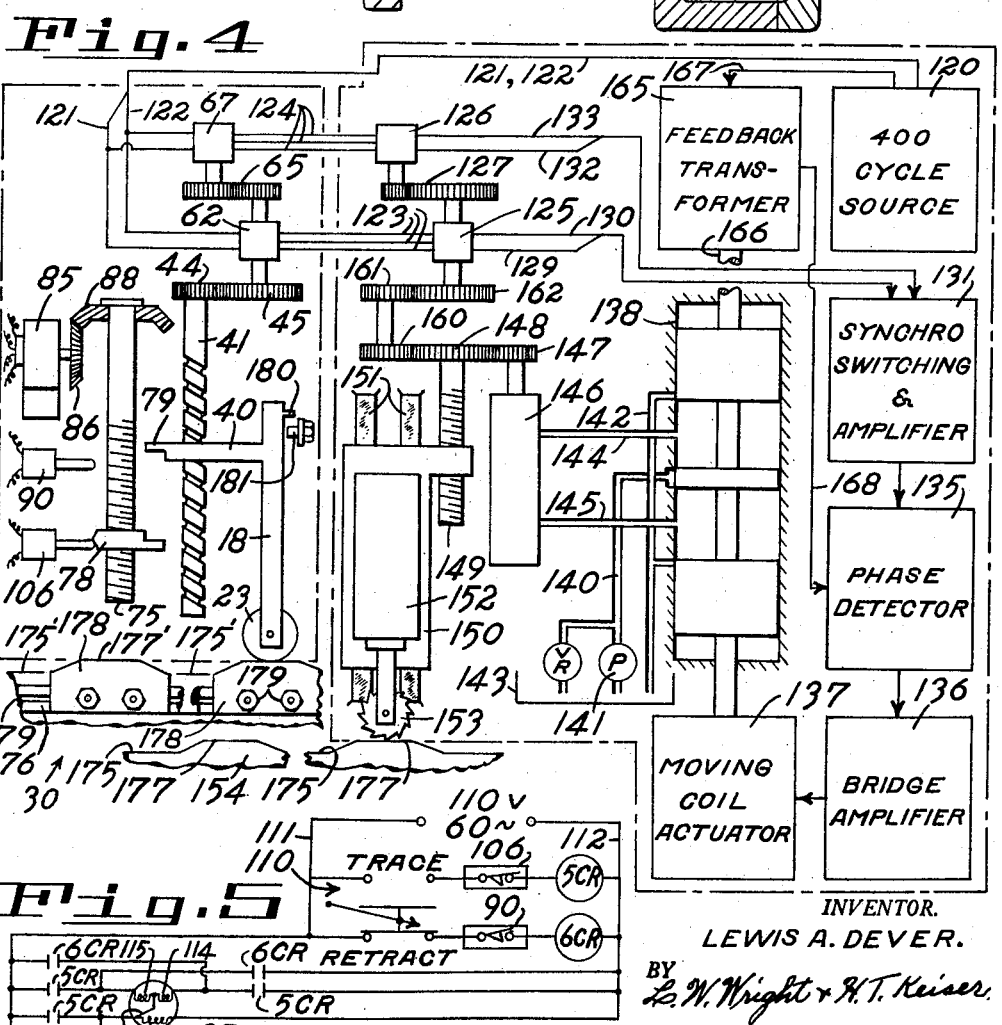
Fig. 4
Fig. 5
INVENTOR.
LEWIS A. DEVER.
BY
ATTORNEYS.

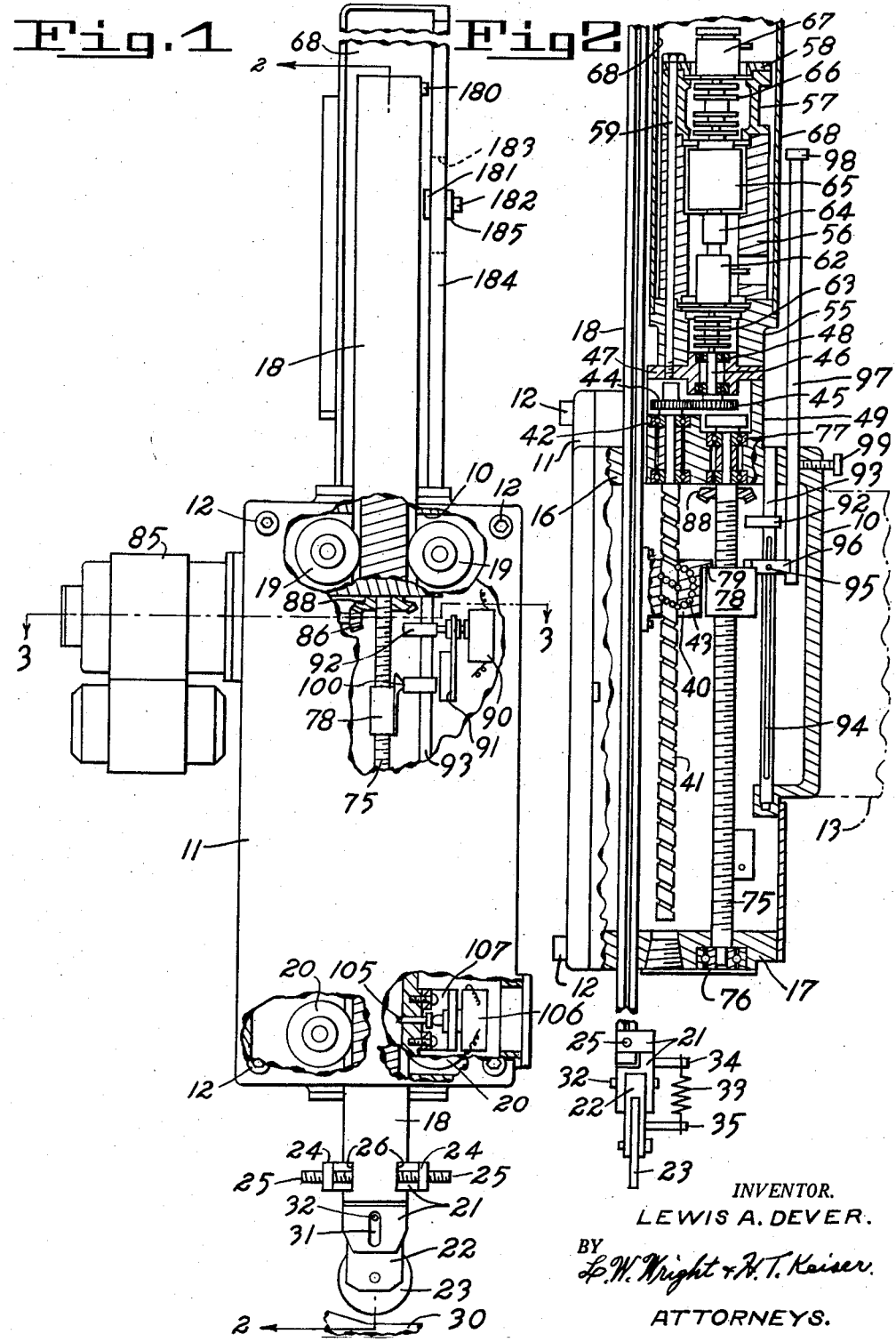

United States Patent Office 2,858,745
Patented Nov. 4, 1958

2,858,745

TRACING MECHANISM FOR MACHINE TOOLS

Lewis A. Dever, Cincinnati, Ohio, assignor to The Cincinnati Milling Machine Co., Cincinnati, Ohio, a corporation of Ohio Application November 15, 1956, Serial No. 622,311

6 Claims. (Cl. 90—62)

This invention relates to improvements in pattern controlled machine tools and, more particularly, to an improved form of tracing device therefor which serves to convert the rectilinear movement of a tracing finger into rotary movement of a control shaft. The control shaft is connected by a servomechanism to the tool positioning motor so as to move the tool relative to the work piece in accordance with the outline of a pattern.

One of the objects of the present invention is to provide a pattern controlled tracer which mechanically converts the rectilinear movement of the tracing finger, as it follows the pattern, into a corresponding rotary movement which is utilized to effect precise positioning of a tool relative to a work piece in accordance with the outline of the pattern.

It is a further object of the invention to provide a tracer construction in which an anti-friction nut carried by the tracing finger meshes with a screw which is journaled for rotation in the tracer housing and drives an output shaft which is connected by a servomechanism with the tool positioning motor. By means of this arrangement, there is provided a very sensitive and precise tracing mechanism which, at the same time, is reliable in its operation and economical to manufacture.

It is a further object of the present invention to provide a novel mechanism for retracting the tracer from the pattern and for returning it into contact therewith.

A further feature of the invention resides in the provision of means whereby a pattern of simplified construction may be utilized in connection with the tracer for effecting straight cuts in the work piece between portions of irregular profile.

With these and other objects in view which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

Fig. 1 is a front elevation of the tracer with parts broken away to show the internal construction thereof.

Fig. 2 is a cross-sectional elevation taken along the line 2—2 in Fig. 1.

Fig. 3 is a cross-sectional view taken along the line 3—3 of Fig. 1.

Fig. 4 is a schematic view of the tracer and tracer control mechanism and exemplifies one type of system in which the tracer is especially suited for use.

Fig. 5 is a wiring diagram showing the electrical circuit of the tracer retracting mechanism.

Similar reference characters designate similar or identical elements and portions throughout the specification and throughout the different views of the drawings.

As shown in Figs. 1, 2, and 3, the tracer unit includes a frame casting 10 which serves to house and support the component parts of the tracer. The frame casting 10 is, in general, in the form of a hollow box provided with a front cover plate 11 which is secured in place on the casting by means of screws 12. The frame casting 10 may, if desired, have integrally formed thereon a mounting bracket 13 by means of which the tracer may be supported on the framework of the machine tool with which it is associated.

As shown in Fig. 2, the casting 10 is provided with a top wall 16 and a bottom wall 17, these walls being apertured to receive a vertically disposed rail 18 which, as shown in Figs. 1 and 3, is supported for reciprocatory movement by a pair of upper guide rolls 19 and a pair of lower guide rolls 20 which are journaled on studs mounted in the casting 10. The lower end of the rail 18 projects beneath the casting 10 where it is fitted with an adjustment bracket 21 which is bifurcated to receive a journal block 22 which itself is bifurcated to receive a tracing roller 23. The bracket 21 is provided with a pair of formed over ears 24 which are drilled and tapped to receive adjustment screws 25 which enter into notches 26 cut in the sides of the rail 18 and bear against the bottoms of the notches to hold the bracket 21 in place on the bottom of the rail. By loosening one screw 25 while tightening the other, the bracket 21 may be shifted forwardly or rearwardly with regard to the direction of travel of the tracer finger with relation to a pattern 30 against which the roller 23 bears. This adjustment provides a convenient means of compensating for the velocity tracing error which is inherent in all tracing systems of this type.

The mounting of the journal block 22 in the bifurcation provided therefor in the bracket 21 is for the purpose of providing a flexible connection between the roll 23 and the lower end of the rail 18. Toward this end, the bracket 21 is provided with a pair of elongated slots 31 for receiving the opposite ends of a pin 32 mounted in the block 22. The pin 32 is normally maintained in the upper end of the slots by means of a spring 33 (Fig. 2) which is tensioned between a pin 34 on the bracket 21 and a pin 35 on the block 22. Should the roller 23 strike an obstruction or encounter a very steep incline on the pattern 30, the spring 33 will yield and permit the block 22 to pivot about one of its upper corners while the pin 32 moves downwardly in the slots 31. Damage of the tracer will thereby be prevented and the block 22 and roller 23 will return to their normal positions as shown in Fig. 1 when the pressure thereon has been released.

The rail 18, bracket 21, block 22, and roller 23, together, constitute the tracing finger of the apparatus and hereafter may be referred to as such.

Secured to the rear face of the rail 18 inside of the tracer is a nut 40 which meshes with a screw 41 journaled for rotation without translation in the casting 10 by means of a pair of anti-friction bearings 42 mounted in the upper wall 16 of the casting. The nut 40 and screw 41 are of the anti-friction type employing a series of balls 43 which provide rolling contact between the nut and the helix formed in the screw. This is a precision device which positively and accurately translates reciprocatory movements of the tracing finger into corresponding rotary movement of the screw 41. Fast on the upper end of the screw 41 is a gear 44 which meshes with a companion gear 45 fast on the lower end of a shaft 46 which is journaled in a bearing block 47 by means of anti-friction bearings 48. The gears 44 and 45 are precision gears which operate without backlash and accurately transmit rotary motion of the screw 41 to the shaft 46.

The block 47 seats on top of side walls 49 formed integrally with the top wall 16 of the casting 10 and is secured thereto by screws (not shown). Supported on the block 47 are hollow castings 55, 56 and 57 mounted one on top of the other, as shown in Fig. 2, and surmounted by a cover plate 58. The castings 55, 56, and 57, together with the plate 58, are held in place on the bearing block 47 by means of long bolts 59 which pass downwardly through the assemblage and thread into tapped holes provided therefor in the block 47.

Supported within the hollow castings is a "fine" synchro transmitter 62 which is adapted to be driven from the shaft 46 through a coupling 63. The shaft of the synchro 62 is connected by a coupling 64 with the input shaft of a gear reduction unit 65. The output shaft of this unit is connected by a coupling 66 with the rotor shaft of a "coarse" synchro transmitter 67. Hence, angular rotation of the screw 41 is accurately transmitted to the fine synchro 62 and, at reduced speed, to the coarse synchro 67. The synchro unit is preferably covered by a casing 68 as shown in Figs. 1 and 2.

In the present embodiment of the invention, the tracing finger is urged downwardly into contact with the pattern 30 by the force of gravity acting on the rail 18. Hence, during tracing operations, the roller 23 will ride along the upper surface of the pattern and translate the contour thereof into corresponding angular rotation of the screw 41. When the end of the pattern is reached, it is desirable to retract the tracing finger away from the pattern and, for this purpose, a lead screw 75 is supported in the casting 10 directly behind the screw 41 and in parallel relation therewith. As shown in Fig. 2, the lead screw 75 is journaled at its lower end in an anti-friction bearing 76 mounted in the bottom wall 17 of the casting 10. At its upper end, the lead screw is journaled in the upper wall 16 of the casting by means of a pair of anti-friction bearings 77. Meshing with the lead screw is a nut 78 which is adapted to engage beneath a lip 79 extending rearwardly from the anti-friction nut 40 so as to lift the latter nut and the tracing finger when the nut 78 is fed upwardly on the lead screw 75. The nut 78 is prevented from turning with the lead screw, as the latter is rotated, by means of a pad 80 (Fig. 3) formed on a vertically extending portion of the casting 10. The surface of the pad 80 lies in close proximity to the side of the nut 78 and thereby prevents it from partaking of the rotation of the lead screw.

To drive the screw 75 in either direction there is provided a reversible electric motor 85 which is mounted on the side of the casting 10. As shown in Fig. 3, the motor is connected in driving relation with a bevel gear 86 journaled for rotation in the casting 10, by means of a coupling 87 which connects the shaft of the motor 85 with the shaft carrying the gear 86. As shown in Fig. 1, the gear 86 meshes with a companion gear 88 fast on the upper end of the lead screw 75. Hence, the lead screw may be rotated by the motor when the latter is energized and thereby translate the nut 78 either up or down along the lead screw depending upon the direction of rotation of the motor.

The extent of retraction of the tracing finger above the template may be controlled by means of a limit switch 90 (Fig. 1) which is supported on a bracket 91 fastened to the casting 10. The limit switch is adapted to be operated by an arm 92 fast on a vertical shaft 93 which is journaled at its upper and lower ends in suitable bores provided therefor in the casting 10. The shaft 93 is provided with a longitudinally extending groove 94 for receiving a pin 95 mounted in an arm 96 which is apertured to receive and slide upon the shaft 93. Hence, the arm 96 is slidably but non-rotatably mounted on the shaft and may be adjusted therealong by means of an outside adjustment comprised of a rod 97 which passes through an aperture provided in the upper wall 16 of the casting 10 and is notched to engage the arm 96. The bar is provided at its upper end with a finger piece 98 by means of which it may be manipulated up or down and is adapted to be held in its adjusted position by means of a thumb screw 99 received in a tapped hole provided in the casting 10 and arranged in clamping relation with respect to the rod.

As shown in Fig. 1, the nut 78 is provided with a cam projection 100 which contacts the arm 96 upon upward travel of the nut and thereby rocks the shaft 93 and the arm 92 and so depresses the plunger of the limit switch 90. This switch, in a manner hereinafter to be described, deenergizes the motor 85 and stops upward travel of the nut 78 and of the tracing finger. Hence, the tracing finger retraction may be controlled as desired by loosening the thumb screw 99 and thereafter adjusting the arm along the shaft 93 by manipulation of the bar 97.

When it is desired to lower the tracing finger onto the pattern 30 at the beginning of a tracing operation, the lead screw 75 is rotated to lower the nut 78 and consequently the tracing finger to thereby permit the roller 23 to engage the pattern. In the present embodiment of the invention, the nut 78 is caused to continue its downward movement after the roller has contacted the upper surface of the pattern, nut 78 leaving the lip 79 when this occurs. Downward travel of the nut 78 continues until the cam projection 100 engages a plunger 105 (Fig. 1) which is slidably received in a bore provided in a portion of the casting 10. The plunger 105 is provided with a head which lies against the end of the plunger of a limit switch 106 supported on a bracket 107 secured to the casting 10. When the switch 106 is operated by the cam projection 100, the motor 85 will be deenergized and thereby stop further downward travel of the nut.

The control of the motor 85 by the limit switches 90 and 106 is illustrated by the wiring diagram shown in Fig. 5. Operation of the motor is initiated by a manual "Trace-Retract" switch 110 which is a single pole, double throw switch connected across power lines 111 and 112 in series with limit switches 90 and 106 and a pair of control relays 5CR and 6CR. In Fig. 5, the switch 110 is shown in the Retract position with the limit switch 90 held open by the cam projection 100 (Figs. 2 and 3) so as to break the circuit through relay coil 6CR and so cause this relay to be deenergized. The relay 5CR is also deenergized due to the open contacts of the switch 110 so that the normally open contacts of these relays shown in the lower left hand portion of the wiring diagram are all open, thereby deenergizing the motor 85. This is the condition which prevails when the tracer is retracted from the pattern and the motor 85 deenergized due to the operation of limit switch 90 by cam projection 100 on the nut 78.

When it is desired to return the tracing finger into contact with the pattern, the switch 110 is turned to its Trace position, thereby closing the circuit from the power lines through the relay coil 5CR. The three normally open contacts of relay 5CR will thereby be closed and cause current to flow through an armature winding 113 of the motor and also through the field winding 114 thereof. No current will flow through the field winding 115 since this winding will be short circuited by the internal connection 116 between one end of the armature winding 113 and the common terminal of the field windings 114 and 115. The motor 85 will now be energized and rotate in a direction to move the nut 78 downward on the lead screw 75, thereby permitting the tracing finger to contact the pattern. Downward travel of the nut 78 will continue until the cam projection 100 operates the plunger 105 to open limit switch 106 and deenergize relay 5CR. This will deenergize motor 85 and stop further downward travel of the nut 78.

After the pattern has been traced by the finger and it is desired to retract the latter, the switch 110 is turned to the Retract position, thereby energizing relay 6CR since limit switch 90 is now closed. Thereby the normally open contacts of this relay will be closed so as to cause current to flow through the armature winding 113 of the motor 85 and also through the field winding 115. Current will not flow through the winding 114 inasmuch as this winding is now shorted out by the internal connection 116. Accordingly, the motor will operate in the reverse direction and lift the nut 78 and cause it to engage beneath the lip 79 on the nut 40 and thereafter to lift the tracing finger away from the pattern until the cam projection 100 contacts arm 96 to open the limit switch 90. When this occurs, relay 6CR will be deenergized and further upward travel of the nut 78 will be terminated.

The complete system including the tracer, the servomechanism, and the tool or cutter is shown in Fig. 4 of the drawings. As herein shown, the rotor windings of the fine synchro transmitter 62 and the coarse synchro transmitter 67 are energized with 400 cycle A. C. current from a source 120 through lines 121 and 122. The stator leads of the synchro transmitters are connected by conductors 123 and 124 to the stator windings of fine and coarse synchro receivers or control transformers 125 and 126, respectively. The rotors of the synchro receivers 125 and 126 are connected by reducing gears 127 which provide the same speed ratio between the rotors of the receivers as that provided by the reduction gearing 65 between the rotors of the fine and coarse transmitter synchros 62 and 67. The rotor winding of the fine synchro receiver 125 is connected by conductors 129 and 130 to a synchronizing network 131. Likewise, the rotor winding of the coarse synchro receiver 126 is connected by conductors 132 and 133 with the network 131. The synchronizing network may be of conventional design and operates to select either the fine or coarse synchro signal, depending upon the magnitude thereof, for transmission to a phase detector 135. Here the phase of the A. C. signal from the synchro is determined, and a corresponding plus or minus D. C. signal provided. This signal is supplied to a power amplifier 136 which drives a moving coil actuator 137 which operates a hydraulic valve 138. This valve has a central pressure port which is connected through a hydraulic line 140 with a source of hydraulic pressure such as pump 141. The valve is also provided with a pair of exhaust ports which are connected by a drain line 142 with a sump 143. The motor ports of the valve are connected by lines 144 and 145 with a hydraulic motor 146 having a drive shaft carrying a gear 147 which meshes with a gear 148 secured to a lead screw 149. This lead screw meshes with a nut carried by a spindle carrier 150 which is vertically slidable along ways 151 provided on the frame of the machine tool. The spindle carrier has mounted thereon a motor 152 which drives a cutter 153 through a right angle drive mechanism of conventional design. The cutter moves across the top surface of a work piece 154 and cuts thereon a contour corresponding to that provided on the pattern 30, it being understood that relative movement between the cutter and work piece and between the tracing finger and pattern takes place simultaneously.

The system is provided with a feedback loop which serves to compare the position of the cutter with that of the tracing finger and to provide an error signal whenever the positions of the elements fail to correspond with one another. This feedback loop includes a gear 160 meshing with the gear 148 on the lead screw 149. The gear 160 is mounted on a common shaft with a gear 161 which meshes with a gear 162 fast on the rotor shaft of the receiver synchro 125. The rotors of the fine and coarse synchro receivers 125 and 126 are thereby caused to follow the movement of the spindle carrier 150 and to provide a null signal whenever the positions of these rotors correspond to the positions of the rotors of synchro transmitters 62 and 67.

A minor feedback loop is also provided for controlling the position of the valve 138 so as to cause the valve to follow the error signal supplied thereto by the servo amplifier. This feedback loop includes a feedback transformer 165 which, for example, may be an E transformer having its armature connected to the plunger of valve 138 by a tie bar 166. The primary winding of the transformer 165 is fed with 400 cycle A. C. current from the source 120 through a line 167, and the output from the secondary winding of the transformer is connected by a line 168 to the input of phase detector 135. Movement of the plunger of valve 138 in response to an error signal supplied by the servo amplifier will thereby provide a voltage of opposite phase from that supplied by the synchronizing network 131 and reduce the signal from the phase detector to zero when the valve plunger has moved a sufficient distance to cancel the error signal.

In certain types of machining operations, such as skin milling of aircraft components, a considerable portion of the cut may comprise a surface of uniform depth such as the portion 175 shown in Fig. 4. In order to simplify the construction of patterns for effecting these cuts, I have provided a skeleton type of pattern 30 comprised of an elongated bar 176 provided with a longitudinally extending T-slot in one side thereof. The raised portions 177 of the cut, which are interposed between the straight portions 175, are effected by pattern elements 178 which are fastened to the bar 176 by means of clamp bolts 179 whose heads are received in the T-slot 179'. The upper edges 177' of the elements 178 are contoured to correspond to the contours 177 to be provided on the work piece 154.

To effect the straight cuts 175 it is necessary that the periphery of the roller 23 on the tracing finger follow the straight line 175' as the finger travels from one element 178 to the next. To obtain this result, I have provided an abutment 180 on the upper end of the rail 18 (Fig. 1) which is adapted to engage against an adjustable stop block 181 which may, for example, be formed by the head of a bolt 182 slidable in an elongated slot 183 provided in a frame bar 184 carried by the frame casting 10 of the tracer. The location of the block 181 may be adjusted as desired along the bar 184 by loosening a clamping nut 185 on the bolt and moving the bolt to the desired position and then tightening the nut to hold the abutment in its adjusted position. In this manner, downward movement of the rail 18 and roller 23 is limited by the block 181 so that when the roll 23 leaves the pattern elements 178 it will travel along the path 175' (Fig. 4) and produce the straight cut 175 on the work piece 154.

While I have shown and described a particular embodiment of my invention herein, it is to be understood that it is capable of being carried out in various ways. Changes, therefore, may be made in the construction and arrangement of my new form of tracing mechanism without departing from the spirit and scope of the invention as expressed in the appended claims which are intended to encompass the patentable novelty inherent in my invention as broadly as is possible in view of the prior art.

I claim:

1. A tracer mechanism for automatic reproducing machines comprising a tracing finger for following the contour of a pattern, said finger being supported for rectilinear movement at right angles to its direction of travel along the pattern, an output shaft, an anti-friction screw and nut device operatively connected with said tracing finger for translating the rectilinear movement thereof into corresponding rotary movement of said output shaft, said screw and nut device including a nut connected to said tracing finger for movement therewith and a screw meshing with said nut and supported for rotation without translation, and a driving connection between said screw and said output shaft whereby rectilinear displacement of said nut is converted into a corresponding angular displacement of said output shaft.

2. The mechanism of claim 1 wherein said tracing finger includes a rail guided for vertical sliding movement above the pattern, and a follower roll carried by the lower end of said rail for engaging the pattern whereby the weight of the rail maintains the follower roll engaged against the pattern.

3. The mechanism of claim 2 including selectively operable means for elevating said rail to retract the follower roll from the pattern.

4. The mechanism of claim 3, wherein said selectively operable means includes a lead screw supported for rotation without translation, and an elevating nut meshing with said screw and engageable with the nut of said screw and nut device for elevating the same.

5. The tracer mechanism of claim 4 including a motor for driving said lead screw in either direction, and means for limiting the vertical travel of said elevating nut by said driving motor.

6. In a tracer mechanism suitable for use with automatic reproducing machines of the type in which a tracing finger follows the contour of a pattern and thereby causes a reproduction of the pattern to be produced by the machine, the combination of a pattern comprising an elongated bar and a plurality of pattern elements spaced along said bar, a tracing finger for following the outline of each of said pattern elements, said finger being supported for rectilinear movement at right angles to its direction of travel along the pattern, and a limit stop for limiting the extent of inward movement of the tracing finger toward the pattern in the absence of a pattern element whereby the tracing finger will follow a straight line path in the space existing between each pair of adjacent pattern elements as it traces along the pattern.

References Cited in the file of this patent

UNITED STATES PATENTS

| 2,726,582 | Roehm | Dec. 13, 1955 |
| 2,735,342 | Glaser | Feb. 21, 1956 |
| 2,778,280 | Trofimov | Jan. 22, 1957 |

FOREIGN PATENTS

| 932,757 | Germany | Sept. 8, 1955 |